United States Patent [19]

Austin

[11] 4,358,289
[45] Nov. 9, 1982

[54] METHOD AND APPARATUS FOR PRODUCING CARBON BLACK

[75] Inventor: Oliver K. Austin, Bartlesville, Okla.

[73] Assignee: Phillips Petroleum Company, Bartlesville, Okla.

[21] Appl. No.: 900,407

[22] Filed: Apr. 26, 1978

[51] Int. Cl.³ ............................................. C01B 31/14
[52] U.S. Cl. ........................................ 23/314; 55/224; 208/48 Q; 261/116; 261/DIG. 54; 422/151; 422/207; 423/456
[58] Field of Search ........ 261/116, DIG. 9, DIG. 54; 208/48 Q; 423/450, 456; 55/224, 259, 260; 422/150–152, 207; 23/314

[56] References Cited

U.S. PATENT DOCUMENTS

| | | | |
|---|---|---|---|
| 873,924 | 12/1907 | Cramer | 55/224 |
| 2,564,700 | 8/1951 | Krejci | 423/456 |
| 2,785,053 | 3/1957 | Larson et al. | 423/456 |
| 3,222,136 | 12/1965 | Hess et al. | 261/DIG. 9 |
| 3,369,870 | 2/1968 | Ganz et al. | 423/450 |
| 3,570,472 | 3/1971 | Santangelo | 261/116 X |
| 3,989,803 | 11/1976 | Henderson | 423/456 X |
| 4,057,602 | 11/1977 | Kolm | 261/116 X |
| 4,058,378 | 11/1977 | Saxton | 261/DIG. 54 |
| 4,069,298 | 1/1978 | Hunt | 423/456 |

Primary Examiner—Richard L. Chiesa

[57] ABSTRACT

In a furnace system for producing carbon black, a primary quench fluid is injected into the combustion products from the furnace to produce effluent. The effluent is passed through a trim quench chamber containing a tubular member. The tubular member has an internal flow path therethrough and is positioned in the housing defining the quench chamber to form an outer flow path therebetween. Part of the effluent flowing through the quench chamber passes through the internal flow path while the remainder passes through the outer flow path. Quench liquid is introduced into the quench chamber for initial contact with substantially only the portion of the effluent passing through the internal flow path.

24 Claims, 2 Drawing Figures

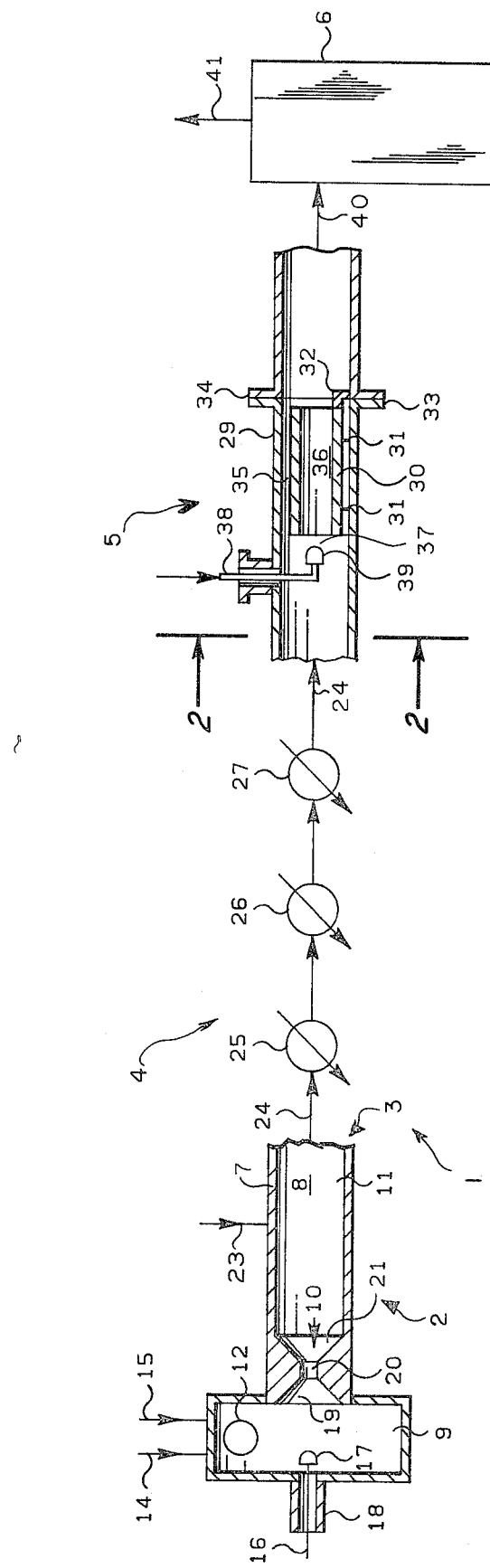
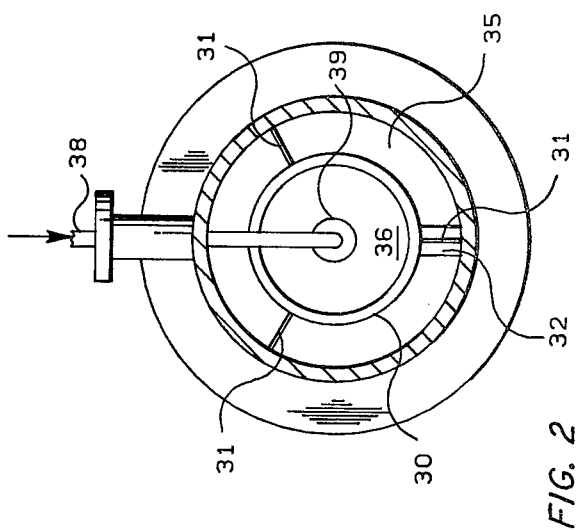
FIG. 1
FIG. 2

METHOD AND APPARATUS FOR PRODUCING CARBON BLACK

The present invention relates to a method and apparatus for producing carbon black.

Carbon black is produced in a carbon black reactor by contacting a carbonaceous feed generally referred to in the art as feed hydrocarbon with hot combustion gases to produce combustion products containing particulate carbon black. The hot combustion gases are at a temperature sufficient to effect pyrolysis of the feed hydrocarbon. By pyrolysis, as hereinafter used, it is meant that the feed hydrocarbon is elevated to a temperature sufficient to convert a feed hydrocarbon to combustion products containing particulate carbon black. The combustion products are cooled by injecting quench fluid into the combustion products to form effluent. In order to separate the particulate carbon black from a gas phase of the effluent it is necessary to subject the effluent to a separation step. Normally, such a separation includes passing the effluent into a bag filter which separates the gas phase from the particulate carbon black by allowing the gas phase to permeate through a porous bag.

However, the use of such a filter system does pose certain problems. If the temperature of the effluent introduced into the filter means is too low, water condensate can form in the filter means, which can cause corrosion due to formation of acidic aqueous liquid (e.g., from $SO_2$ in the effluent gases). Also, if the temperature of the effluent is too high, then heat damage to the filter means can occur. Therefore, it is important that the effluent temperature be held within certain prescribed ranges, which will be dependent on the particular type of filter means utilized.

It is normal procedure to subject the effluent to several cooling steps before the effluent is introduced into the filter means. One advantageous way of cooling the combustion products is first directly contacting the combustion products with a quench fluid such as cooled smoke or water to lower the temperature of the combustion products below the pyrolysis or carbon black producing temperature, e.g., to below about 2000° F. and thereby form effluent. After this, the effluent can be subjected to indirect heat exchange such as in a boiler unit or the like. Multiple steps of indirect heat exchange can be used. The gases exit the final indirect cooling at a temperature in the range of about 600° F. to about 1000° F. After the indirect heat exchange cooling a final direct contact trim cooling of the effluent is effected, e.g., to a temperature in the range of about 400° F. to about 750° F., before the thus cooled effluent enters the filter means. Such a final or trim cooling step is disclosed in U.S. Pat. No. 3,369,870. However, because the temperature of the effluent entering the final quench locus is usually below about 1000° F., and can be as low as 600° F., the introduction of quench liquid into the effluent can result in slow evaporation of the introduced quench liquid. If complete vaporization is not achieved, a certain portion of the quench liquid will collect in the final quench chamber and can cause corrosion of the housing defining the quench chamber. The housing defining the final or trim quench chamber is normally an uninsulated carbon steel unit, and condensation of water vapor, which is present in the effluent, along with acid gases such as $SO_2$ in the effluent (the $SO_2$ is produced from sulfur compounds mixed with the feed hydrocarbon), can combine and form $H_2SO_3$. The aqueous $H_2SO_3$ corrodes the inner surface of the housing.

The present invention provides an apparatus and method for substantially eliminating the collecting of quench liquid in the final or trim quench chamber. By placing a tubular member within the final quench chamber in a manner such that the final quench chamber is divided into two flow paths, one surrounding the other, the quench liquid can be injected into the innermost flow path, i.e., the one defined by and extending through the tubular member. Such an arrangement prevents contact of the quench liquid with the housing defining the quench chamber. The portion of the effluent flowing through the annular flow path around the tubular member keeps the tubular member at a sufficiently high temperature to help effect substantially complete vaporization of the quench liquid sprayed into the innermost flow path. The heated surface area afforded by the tubular member aids in the vaporization of the quench liquid. After the effluent portions flow through the respective flow path, they are mixed downstream of the tubular member and the resulting mixture is subsequently introduced into the filter means. Such an arrangement provides temperature control of the effluent before introduction of the effluent into the filter means and also prevents the collection of quench liquid in the final quench chamber.

It is an object of the present invention to provide an apparatus which substantially reduces or eliminates the collection of quench liquid in an effluent quenching chamber. It is an object of the present invention to provide a method of producing carbon black which will substantially reduce or eliminate the collection of quench liquid in an effluent quenching chamber. It is a further object of the present invention to provide a method and apparatus for producing particulate carbon black which is well adapted for its intended use.

Other objects and advantages of the present invention will become apparent from the following detailed description taken in connection with the accompanying drawings wherein are set forth by way of illustration and example certain embodiments of this invention.

FIG. 1 is a schematic sectional view of a carbon black producing apparatus.

FIG. 2 is a sectional view of a portion of the apparatus taken along the line 2—2, FIG. 1.

The reference numeral 1 designates generally an apparatus for producing carbon black which apparatus includes a reactor 2 of any suitable type, for example, that disclosed in U.S. Pat. No. 2,564,700. The reactor 2 is operable for producing combustion products containing particulate carbon black. The combustion products can be quenched in the reactor 2 to produce effluent which is discharged from an outlet 3. Downstream of the outlet 3, heat exchange means 4 is in flow communication with the reactor 2, the heat exchange means 4 is operable for reducing the temperature of the effluent and preferably is of an indirect heat exchange type. Trim quench means 5 is connected in downstream flow communication to the heat exchange means 4 trim or final quench means 5 is operable for further cooling the effluent before the effluent is discharged from the trim quench means 5 into separating means 6. The separating means 6 is operable for separating the effluent into an off gas portion or phase and a particulate carbon black portion or phase.

As described above the reactor 2 can be of any suitable type and preferably is of a type to effect vortex flow of the combustion products and effluent. As shown, the reactor 2 includes a refractory lined housing 7 which defines an internal chamber 8 which includes a precombustion chamber or compartment or zone 9 which is in flow communication with a reaction chamber or compartment or zone 10 which is downstream of the precombustion chamber 9. Primary quench chamber or compartment or zone 11 is in downstream flow communication with the reaction chamber 10. Preferably, the chambers 9, 10 and 11 are in axial alignment. First inlet means 12 opens into the precombustion chamber 9 and preferably is directed to introduce hot combustion gases or combustion gases for later ignition into the precombustion chamber 9 in a generally tangential direction relative to the precombustion chamber 9. Combustion gases are supplied to the inlet means 12 via conduits 14 and 15 which supply combustible fuel and air, respectively. Inlet means 16 opens into the chamber 8 and is operable for introducing a feed hydrocarbon into the chamber 8, preferably into either the precombustion chamber 9 or the reaction chamber 10. The inlet means 16 preferably has a nozzle 17 on the end thereof for spraying the feed hydrocarbon into the chamber 8. Axial air for cooling the inlet means 16 and nozzle 17 can be introduced into the precombustion chamber 9 via a conduit 18 which surrounds a conduit portion of the inlet means 16.

The reaction chamber 10, as shown, includes a converging section 19 which converges in a downstream direction to a throat section 20. There is downstream of the throat 20 a downstream diverging section 21. The converging section 19, the throat section 20 and diverging section 21 cooperate to form a venturi in the chamber 8. The converging section 19 can have a total angle of convergence of between about 20° and 60° while the diverging section 21 can have a total angle of divergence of between about 5° and 15°.

Inlet means 23 open into the quench chamber 11 and is operable for introducing a quench fluid such as cooled smoke or water into the quench chamber 11 for contact with the combustion products flowing through the quench chamber 11 to thereby cool the combustion products and produce effluent.

In the operation of the reactor 2, combustion gases are introduced via the inlet 12 and initially flow in a vortex manner surrounding the feed hydrocarbon introduced via the nozzle 17. The feed hydrocarbon is contacted by the hot combustion gases to elevate the temperature of the feed hydrocarbon to its pyrolysis temperature, i.e., the temperature necessary to convert the feed hydrocarbon to particulate carbon black. The majority of the pyrolysis occurs in the reaction chamber 10. The pyrolysis temperature is generally in the range of about 2400° F. to about 2900° F. and will be dependent upon the type of feed hydrocarbon introduced and the type of carbon black desired to be produced. The pyrolysis produces gaseous combustion products containing particulate carbon black. The thus-produced combustion products flow into the quench chamber 11 for contact with the quench fluid to lower the temperature of the combustion products to a temperature below the pyrolysis temperature, to thereby stop the carbon black producing pyrolysis reaction. The photelometer of the carbon black can be controlled by selecting the position of the inlet 23 along the length of the reactor 2. The inlet 23 can be directed, relative to the quench chamber 11, either radially or tangentially for counter-rotational introduction of the quench fluid or corotational introduction of the quench fluid relative to the vortex flow of the combustion products. A plurality of axially spaced quench inlets 23 can be used. The produced effluent is discharged via the outlet 3.

A conduit 24 connects the heat exchange means 4 in flow communication to the outlet 3. Preferably the heat exchange means 4 includes a plurality of heat exchangers 25, 26 and 27 which are connected in series flow communication. The heat exchangers 25, 26 and 27 are preferably of an indirect heat exchange type and are operable for further cooling of the effluent to a temperature in the range of about 600° to about 1000° F. after exiting the last heat exchanger 27. A reason for the use of a plurality of series connected heat exchangers is to effect heating of various substances. For example, the first heat exchanger 25 can be used to heat water to produce steam, while the second heat exchanger 26 can be used to heat the feed hydrocarbon before it is introduced into the reactor via the inlet 16 and while the third heat exchanger 27 can be used to heat air before introduction of the heated air into the precombustion chamber 9 via the inlet 12. Such an arrangement of heat exchangers prevents the loss and waste of valuable heat.

The conduit 24 also connects the heat exchange means 4 and the trim quench means 5 in flow communication. The trim quench means 5 includes a tubular housing 29 defining a quench chamber or compartment 37 in which there is positioned a tubular member 30 which is preferably coaxial with the chamber 37. Preferably, the tubular member 30 has a generally cylindrical exterior surface spaced from a generally cylindrical interior surface of the housing 29 forming an annular flow path 35 therebetween. Also, the tubular member 30 has opposite open ends. One advantageous way of maintaining the position of the tubular member 30 from the tubular member 29 is by having a plurality of arms radiating outwardly from the tubular member 30 at different positions along the length thereof. The use of the arms 31 permits mounting of the tubular member 30 within the tubular member 29 in a removable manner. To prevent axial movement of the tubular member 30 relative to the tubular member 29, a stop 32 can be secured in the tubular member 29, for example, between connecting flange portions 33 and 34. The outside diameter of the tubular member 30 will generally be between about 20 percent and about 95 percent and preferably about 40 percent to about 90 percent of the diameter of the quench chamber 37 and the wall thickness of tubular member 30 is relatively thin. This results in the transverse cross-sectional area of the annular flow path 35 generally being in the range of about 10 percent to about 2500 percent and preferably about 20 percent to about 525 percent of the transverse cross-sectional area of the axial flow path 36 through and defined by the tubular member 30. The tubular member 30 has a length sufficient to allow substantially complete vaporization of the quench liquid introduced thereinto. The length of tubular member 30 is preferably in the range of about 1.7 to about 40 and preferably about 3 to about 15 times the outside diameter of the tubular member 30.

Quench liquid inlet means 38 opens into the tubular member 30 and has a nozzle 39 directed to spray quench liquid, for example, water, in a downstream direction into the flow path 36 to the at least substantial exclusion of the introduction of quench liquid into the flow path 35. Preferably, the quench liquid spray is introduced into the tubular member 30 adjacent the upstream end of member 30. The liquid spray will generally be in the shape of a cone diverging downstream and flowing from the upstream end to the downstream end of the tubular member 30. The axis of the nozzle 39 preferably is coaxial with the longitudinal axis of the tubular member 30. The liquid spray can be a hollow cone or a solid cone with a solid cone being preferred. It is desirable to prevent the introduction of any quench liquid into the annular flow path 35, in order to prevent the collection of water in the tubular member 29. The effluent is divided into two portions by the tubular member 30, of which one portion flows through the annular flow path 35 while the other portion flows through the inner flow path 36 for contact with the quench liquid and subsequent cooling. After the effluent portions exit from the flow paths 35 and 36, mixing of the portions will occur in a downstream portion of the tubular member 29 before the thus finally quenched effluent is discharged from the tubular member 29 via a conduit 40 into the separator means 6. The mixing of the effluent portions will bring the effluent to a uniform temperature because the effluent portion flowing through the flow path 36 will cool the effluent portion flowing through the flow path 35. The temperature of the effluent entering the trim quench means 5 is usually in the range of about 600° F. to about 1000° F. and after exiting the trim quench means 5, the effluent temperature is usually in the range of about 400° F. to about 750° F., dependent upon the type of separator means 6 employed.

The separator means 6 can be of any suitable type and preferably is of a bag filter type. The filter means 6 is operable for separating the effluent into an off gas portion or phase, which is discharged via an outlet 41, and a particulate carbon black portion or phase which is discharged via an outlet 42.

The following is a calculated example to illustrate an operation of the present invention:

|  | Calculated Example | Typical Ranges |
| --- | --- | --- |
| Tubular Member 29: |  |  |
| Inside Diam., inches, (a), |  | 30 to 60 |
| Material |  | Carbon Steel |
| Tubular Member 30: |  |  |
| Outside Diam., % of (a), |  | 20 to 95 |
| Outside Diam., inches, |  | 6 to 57 |
| Length, inches, |  | 100 to 240 |
| Thickness of Wall, inches, |  | 0.125 to 0.375 |
| Material, |  | Carbon Steel |
| Typical Operation |  |  |
| Trim Quench Means 5: |  |  |
| Inside Diam. of quench member 37, inches | 40 |  |
| Outside Diam. of 30, inches | 34 |  |
| Length of 30, inches, | 120 |  |
| Wall Thickness of 30, inches, | 0.25 |  |
| Trim Quench Water via 38: |  |  |
| Gal./hr., | 5 |  |
| Temperature, °F., | 100 |  |
| Nozzle Total Spray Angle, Degrees, (Range is 90° to 120°) | 105 |  |
| Cone Type, (Water Added in downstream direction of centerline of member 30 at upstream end of member 30) | Solid |  |
| Effluent Temperature in Chamber 37 Upstream of 38, °F. | 500 |  |
| Effluent Temperature in 40, °F., | 570 |  |

Without the use of tubular member 30, it is estimated that 7 gallons per hour of 100° F. secondary or trim quench water is required to attain 570° F. temperature of the effluent in the conduit 40. In an uninsulated tubular member 29, without the tubular member 30, there can be poor evaporation of water added via inlet 38. Without the tubular member 30, water can accumulate in the interior of the tubular member 20. Since acid gases such as $SO_2$ and $CO_2$ can be present in the effluent, dilute aqueous acid, e.g., dilute $H_2SO_3$, can be formed which could corrode the system at this locus; hence, the importance of using the tubular member 30 is apparent.

It is to be understood that while there has been illustrated and described certain forms of the present invention it is not to be limited to the specific form or arrangement of parts or steps herein described and shown except to the extent that such limitations or their equivalents are found in the claims.

What is claimed and desired to be secured by Letters Patent is:

1. An apparatus for cooling gases, said apparatus including:

first means for producing hot gases;

a first tubular member defining a first quench compartment in flow communication with and downstream of said first means, said first tubular member having a first discharge;

vaporization means for substantially completely vaporizing a quench liquid introduced into said first tubular member, said vaporization means comprising a second tubular member mounted within and extending generally along the longitudinal axis of, a portion of said first quench compartment, with a substantial portion of the exterior surface of said second tubular member being spaced from the traversely adjacent interior surface of said first tubular member, thereby forming a first flow path between said first and second tubular members, said second tubular member having a second flow path extending therethrough, having first and second open ends with said first open end being upstream of said second open end and being effective for substantially complete vaporization in said second flow path of a quench liquid introduced thereto; and first inlet means opening into said first quench compartment and being operable for introducing said quench liquid into said second flow path for flow along said second flow path in a direction generally from said first open end to said second open end.

2. An apparatus as in claim 1 wherein:

said first tubular member has a diameter relative to a diameter of said second tubular member defining said first flow path such that said first flow path has a portion of said hot gases flowing therethrough, said portion keeping said second tubular member at a sufficiently high temperature to effect substantially complete vaporization of said quench fluid introduced into said second flow path.

3. An apparatus as set forth in claim 1 or 2 wherein said first means includes:

a housing defining a chamber comprising a reaction compartment and a second quench compartment in flow communication with and downstream of the reaction compartment, said housing having a second discharge downstream of said second quench compartment;

second inlet means opening into said chamber and operable for introducing combustion gases into said chamber;

third inlet means opening into said chamber and operable for introducing feed into said chamber; and fourth inlet means opening into said second quench compartment and operable for introducing quench fluid into said second quench compartment.

4. An apparatus as set forth in claim 3 wherein: said first inlet means opens into said first quench compartment at a position adjacent said first open end.

5. An apparatus as set forth in claim 4 wherein: said second tubular member is generally coaxial with said first tubular member and is spaced from the interior surface of the first tubular member, whereby said first flow path is generally annular.

6. An apparatus as set forth in claim 5 including: stop means positioned in said first quench compartment adjacent said second tubular member and cooperating with said second tubular member for selectively retaining said second tubular member against axial movement toward said first discharge; and wherein said second tubular member is removably mounted in said first quench compartment.

7. An apparatus as set forth in claim 3 wherein: said first inlet means includes a discharge nozzle positioned in said first quench compartment and is operable for spraying quench liquid in a generally cone shape generally toward said second open end.

8. An apparatus as set forth in claim 7 wherein: said nozzle is directed to discharge quench liquid substantially only into the second flow path.

9. An apparatus as set forth in claim 8 wherein: said second tubular member has a length sufficient to allow substantially complete vaporization of quench liquid introduced thereinto.

10. An apparatus as in claim 9 wherein: said length is in the range of about 1.7 to about 40 times an outside diameter of said second tubular member.

11. An apparatus as in claim 9 wherein: said length is in the range of about 3 to about 15 times said outside diameter of said second tubular member.

12. An apparatus in accordance with claim 1 wherein: said hot gases contain particulate material, further comprising means for receiving the fluid from said first and second flow paths and for separating the thus received fluid into a particulate phase and a gas phase.

13. An apparatus as in claim 1 wherein: said second tubular member has an outside diameter in the range of between about 20 percent to 95 percent of the diameter of said first tubular member.

14. An apparatus as in claim 1 wherein: said second tubular member has an outside diameter in the range of between about 40 percent to about 90 percent of the diameter of said first tubular member.

15. A method which comprises:
producing a hot gaseous stream;
separating said hot gaseous stream into a first portion and a second portion;
flowing said first portion along a first flow path in a first quench zone and flowing said second portion along a second flow path in the first quench zone with said first flow path partially surrounding the second flow path;
contacting substantially only said second portion with quench liquid as said first and second portions flow along said first and second flow paths to thereby further cool said second portion and to substantially completely vaporize said quench liquid; and
admixing said first and second portions after flow along said first and second flow paths.

16. A method as set forth in claim 15 further comprising:
contacting a feed hydrocarbon with hot combustion gases in a reaction zone;
pyrolyzing said feed hydrocarbon thereby producing combustion products containing particulate carbon black; and
contacting the thus produced combustion products with quench fluid in a second quench zone to thereby cool the combustion products to a temperature below a carbon black producing temperature and thereby produce said hot gaseous stream.

17. A method as set forth in claim 16 including:
separating the thus admixed first and second portions into a particulate carbon black phase and an off gas phase in a separating zone.

18. A method as set forth in claim 17 wherein: said first flow path is generally annular in transverse cross sectional shape and is separated from the second flow path by a tubular member.

19. A method as set forth in claim 15 wherein said first flow path is generally annular in transverse cross-sectional shape and is separated from the second flow path by a tubular member.

20. A method as set forth in claim 19 wherein said quench liquid is sprayed substantially only into the interior volume of said tubular member for contact with substantially only said second portion.

21. A method as set forth in claim 20 wherein said quench liquid is substantially completely vaporized in the second flow path.

22. A method as set forth in claim 18 wherein: said quench liquid is sprayed substantially only into the second flow path.

23. A method as set forth in claim 22 wherein: said quench liquid is substantially completely vaporized in the second flow path.

24. A method as in claim 15 wherein: said hot gaseous stream is at a temperature in the range of about 600 to about 1000 degrees Fahrenheit.

* * * * *

UNITED STATES PATENT AND TRADEMARK OFFICE
CERTIFICATE OF CORRECTION

PATENT NO. : 4,358,289
DATED : November 9, 1982
INVENTOR(S) : Oliver K. Austin

It is certified that error appears in the above—identified patent and that said Letters Patent is hereby corrected as shown below:

Column 7, line 21 (claim 7, line 1) "3" should read --- 4 ---.

Signed and Sealed this

First Day of March 1983

[SEAL]

Attest:

GERALD J. MOSSINGHOFF

Attesting Officer

Commissioner of Patents and Trademarks